United States Patent
Dolinskiy

(10) Patent No.: US 11,465,458 B1
(45) Date of Patent: Oct. 11, 2022

(54) ANTI-RATTLE DEVICE FOR VEHICLE HITCHES

(71) Applicant: Viktor Dolinskiy, Matthews, NC (US)

(72) Inventor: Viktor Dolinskiy, Matthews, NC (US)

( * ) Notice: Subject to any disclaimer, the term of this patent is extended or adjusted under 35 U.S.C. 154(b) by 0 days.

(21) Appl. No.: 17/304,397

(22) Filed: Jun. 21, 2021

(51) Int. Cl.
    *B60D 1/24*    (2006.01)
    *B60D 1/60*    (2006.01)

(52) U.S. Cl.
    CPC ............... *B60D 1/241* (2013.01); *B60D 1/60* (2013.01)

(58) Field of Classification Search
    CPC .................................. B60D 1/241; B60D 1/60
    See application file for complete search history.

(56) References Cited

U.S. PATENT DOCUMENTS

| | | | | |
|---|---|---|---|---|
| 6,382,656 | B1 * | 5/2002 | Johnson, Jr. ............. | B60D 1/60 280/506 |
| 9,616,722 | B2 * | 4/2017 | Williams ................. | B60D 1/52 |
| 10,246,018 | B1 * | 4/2019 | Chen ........................ | B60R 3/02 |
| 10,793,079 | B1 * | 10/2020 | Shen ....................... | B60D 1/241 |
| 10,800,218 | B2 * | 10/2020 | Columbia ................. | F16B 1/00 |
| 2014/0327228 | A1 * | 11/2014 | Laurer ..................... | B60D 1/60 280/506 |
| 2020/0346503 | A1 * | 11/2020 | Pedersoli ............... | B60D 1/065 |
| 2021/0316581 | A1 * | 10/2021 | Brunson ................ | B60D 1/241 |

FOREIGN PATENT DOCUMENTS

CA      2512381 A1 * 1/2007 ............... B60D 1/06

* cited by examiner

*Primary Examiner* — Kevin Hurley
(74) *Attorney, Agent, or Firm* — Dunlap Bennett & Ludwig, PLLC

(57) ABSTRACT

A vehicle hitch insert, assembly, and system are disclosed. As part of the system, a hitch receiver is coupled to a vehicle. A hitch receiver cover is coupled to the hitch receiver and includes a lateral side that defines at least one receiver cover opening with a first diameter. Further, a hitch insert includes a substantially U-shaped main body that is slidably coupled to a lateral side of a hitch receiver cover. The main body includes a first wall defining a plurality of hitch insert openings that partially overlap with one another, with each hitch insert opening having a second diameter, a second wall connected to the first wall at a first joint, and a third wall connected to the second wall at a second joint. In use, a fastener extends through the at least one receiver cover opening and one of the plurality of hitch insert openings.

10 Claims, 4 Drawing Sheets

ANTI-RATTLE DEVICE FOR VEHICLE HITCHES

BACKGROUND OF THE INVENTION

The present invention relates to vehicle hitch covers and, more particularly, to an insert device that is used to prevent the rattling or wobbling of a hitch cover.

Hitch covers are commonly used to cover hitch receivers on vehicles when the hitch receiver is not in use. Functionally, they cover and protect the hitch opening, and may be decorative in nature. Hitches may be used to couple vehicles to various structures for towing, such as, but not limited to, trailers, cargo carriers, and bicycle racks.

Hitch covers, once installed, are prone to rattling, which creates an unpleasant noise that the operator and passengers are forced to bear while the vehicle is being driven. This is often because the bolt that is used to secure the hitch cover is smaller in diameter than the holes in the hitch cover that it is inserted into and because the hitch cover is slightly smaller in size than the hitch receiver opening it is used to cover. Prior to the present invention, there were no solutions that addressed this problem.

As can be seen, there is a need for a device that is inserted onto a hitch receiver to reduce for fully prevent the rattling of a hitch cover.

SUMMARY OF THE INVENTION

In one aspect of the present invention, a hitch insert comprises: a substantially U-shaped main body configured to slidably couple to a lateral side of a hitch receiver cover, the main body comprising: a first wall defining a plurality of hitch insert openings that partially overlap with one another, with each hitch insert opening having a diameter; a second wall connected to the first wall at a first joint; and a third wall connected to the second wall at a second joint.

In another aspect of the present invention, a hitch assembly comprises: a hitch receiver cover comprising a lateral side defining at least one receiver cover opening having a first diameter; and a hitch insert comprising a substantially U-shaped main body slidably coupled to a lateral side of a hitch receiver cover, the main body comprising: a first wall defining a plurality of hitch insert openings that partially overlap with one another, with each hitch insert opening having a second diameter; a second wall connected to the first wall at a first joint; and a third wall connected to the second wall at a second joint.

In yet another aspect of the present invention, a hitch system comprises: a hitch receiver coupled to a vehicle; a hitch receiver cover coupled to the hitch receiver and comprising a lateral side defining at least one receiver cover opening having a first diameter; a hitch insert comprising a substantially U-shaped main body slidably coupled to a lateral side of a hitch receiver cover, the main body comprising: a first wall defining a plurality of hitch insert openings that partially overlap with one another, with each hitch insert opening having a second diameter; a second wall connected to the first wall at a first joint; and a third wall connected to the second wall at a second joint; and a fastener extending through the at least one receiver cover opening and one of the plurality of hitch insert openings.

These and other features, aspects and advantages of the present invention will become better understood with reference to the following drawings, description and claims.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a hitch insert that includes a substantially U-shaped main body configured to slidably couple to a lateral side of a hitch receiver cover. The main body includes: (1) a first wall defining a plurality of hitch insert openings that partially overlap with one another, with each hitch insert opening having a diameter; (2) a second wall connected to the first wall at a first joint; and (3) a third wall connected to the second wall at a second joint.

Figure 1:
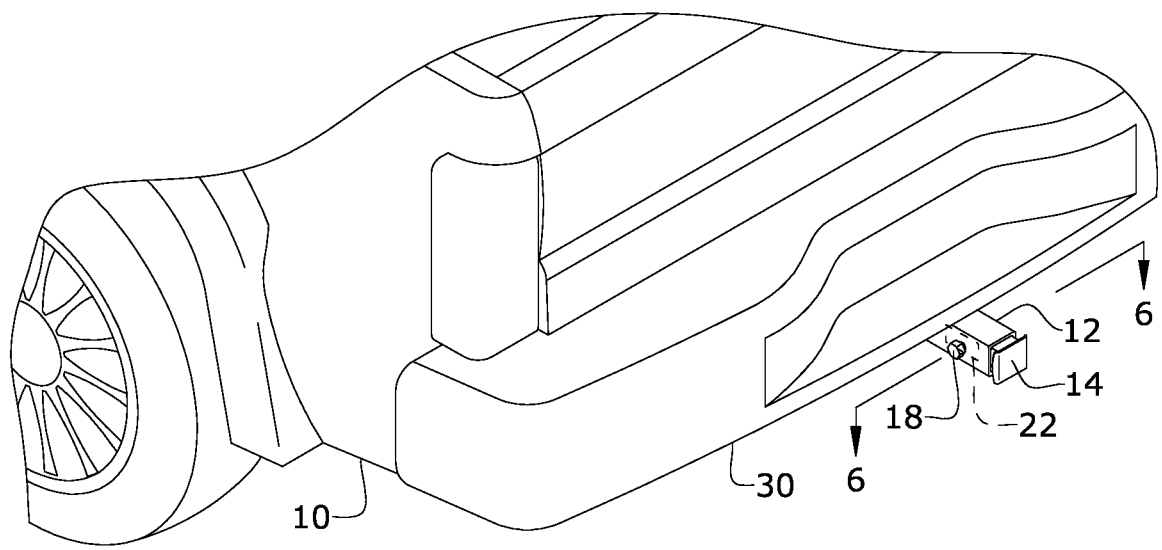
FIG. 1 is a perspective view of an embodiment of the present invention, shown in use.
Figure 5:
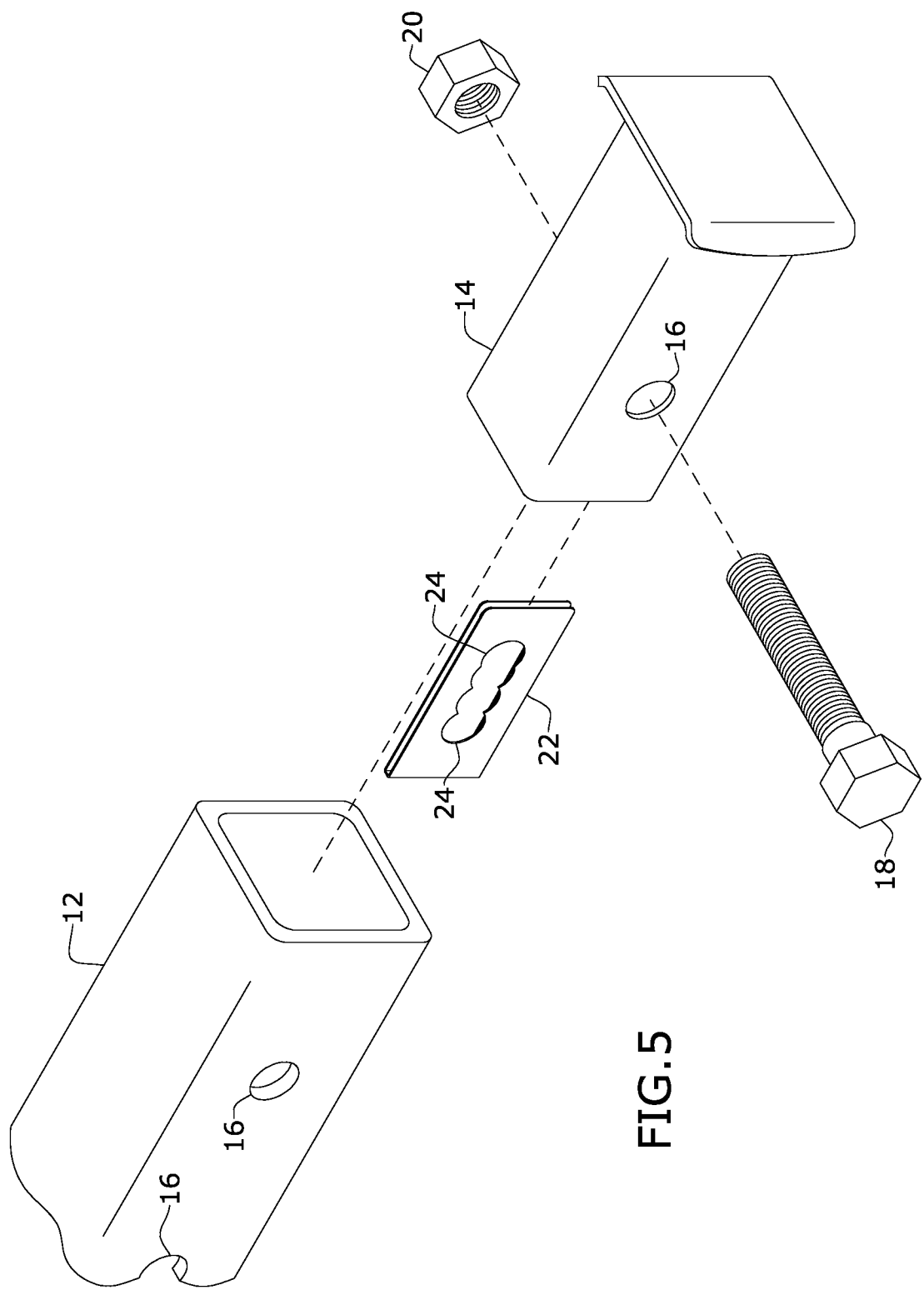
FIG. 5 is an exploded in-use perspective view of the embodiment of the present invention.

Referring to FIG. 1, an anti-rattle hitch system includes a vehicle 10, a hitch receiver 12, a receiver cover 14, and a hitch insert 22. As will be appreciated by those with skill in the art, the vehicle 10 may be any vehicle that includes a hitch receiver 12, and typically includes a bumper 30 on a rear portion thereof, with the hitch receiver 12 being coupled to the vehicle 10 adjacent the bumper 30. The hitch receiver 12 includes one or more sets of fastener openings 16 (each set including an opening 16 disposed on opposite lateral sides of the hitch receiver 12) for receiving a fastener, such as a bolt 18 or a pin. Bolts 18 typically include a thread portion, a shank portion, and a head portion. As shown in FIG. 5, the receiver cover 14 also includes one or more sets of fastener openings 16, similar to the openings 16 on the hitch receiver. In use, the bolt 18 couples to a nut 20 (or another suitable complementary fastener) to retain the receiver cover 14 in place. Further, in use, the hitch insert 22 couples with one lateral side of the receiver cover 14, as described in greater detail below.

Figure 2:
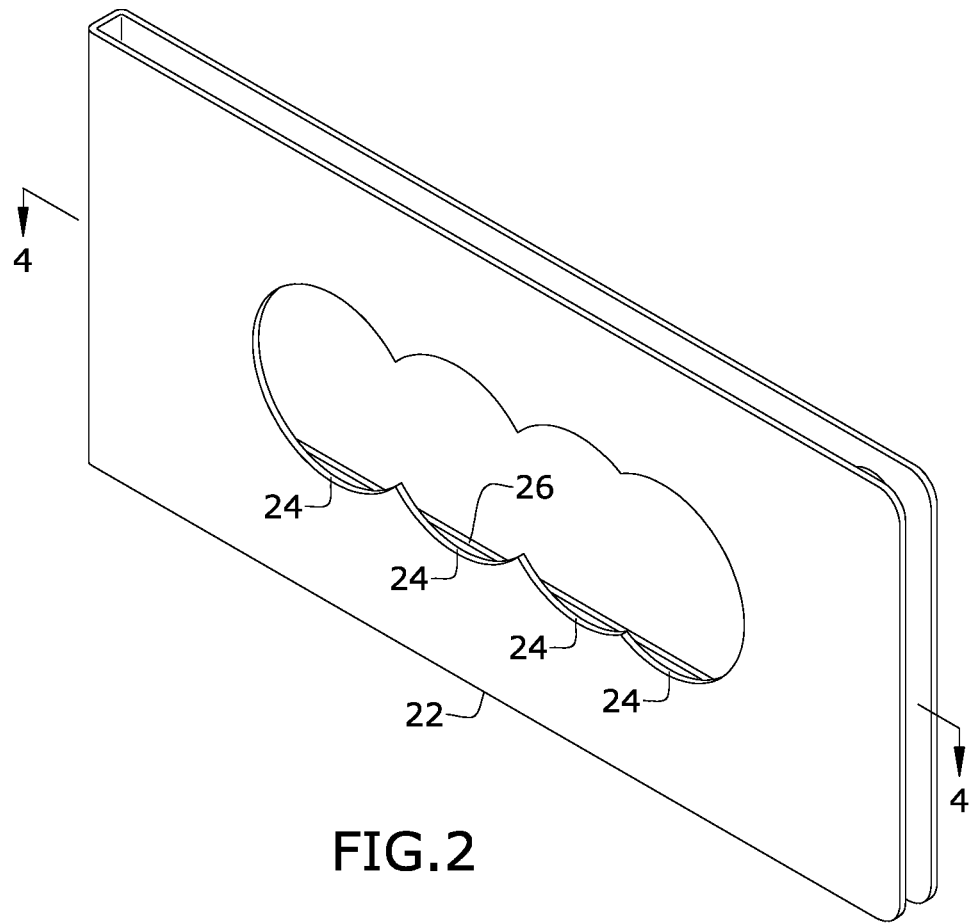
FIG. 2 is a front perspective of the embodiment of the present invention.
Figure 3:
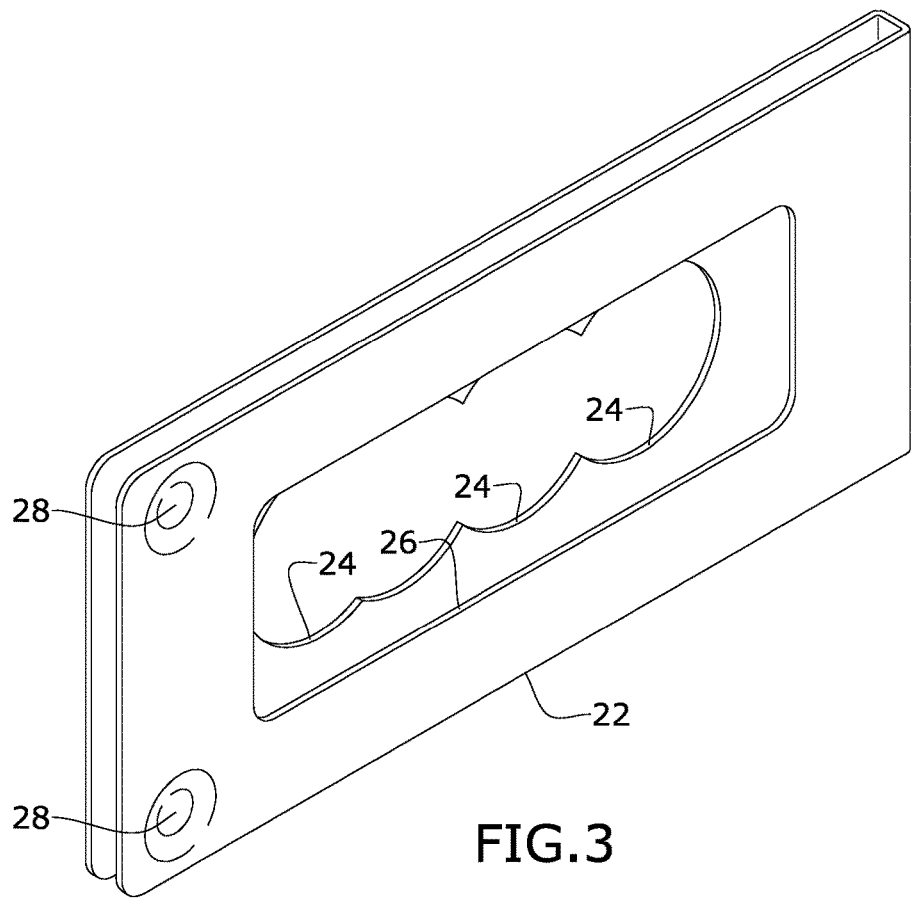
FIG. 3 is a rear perspective view of the embodiment of the present invention.
Figure 4:
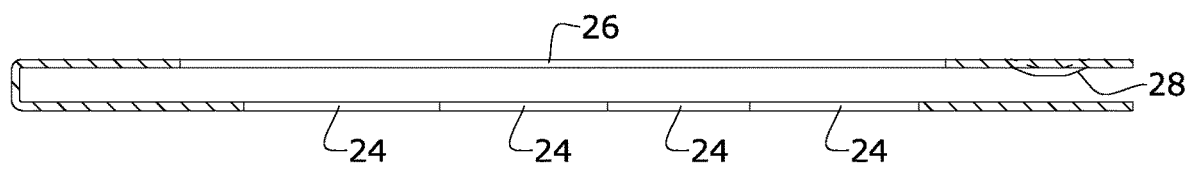
FIG. 4 is a section view taken along line 4-4 of FIG. 2.

As shown in FIGS. 2-4, the hitch insert 22 includes a plurality of fastener openings 24 for receiving the bolt 18 or pin. The hitch insert further includes a large opening 26 (which may be rectangular-shaped, for example) on a side opposite to the fastener openings 24, with that side further including dimples 28 on an inner side thereof. The fastener openings 24 partially overlap to generally define a larger opening, and the openings 24 are designed such that a single insert 22 can accommodate various receiver covers 14 that may have fastener openings 16 disposed at different locations along its length. For example, if a fastener opening 16 is disposed towards a distal end of the receiver cover 14, the distal-most opening 24 on the hitch insert 22 may be used in a manner described in greater detail below. Similarly, if a fastener opening 16 is disposed towards a proximal end of the receiver cover 14, the proximal-most opening 24 on the hitch insert 22 may be used in a manner described in greater detail below. Likewise, intermediate fastener openings 24 on the insert 22 may be aligned with intermediately located fastener openings 16 on the receiver cover 14. In other embodiments, receiver covers 14 may also include similarly formed openings as the insert 22 to facilitate installation variously located fastener openings on the hitch receiver 14.

Figure 6:
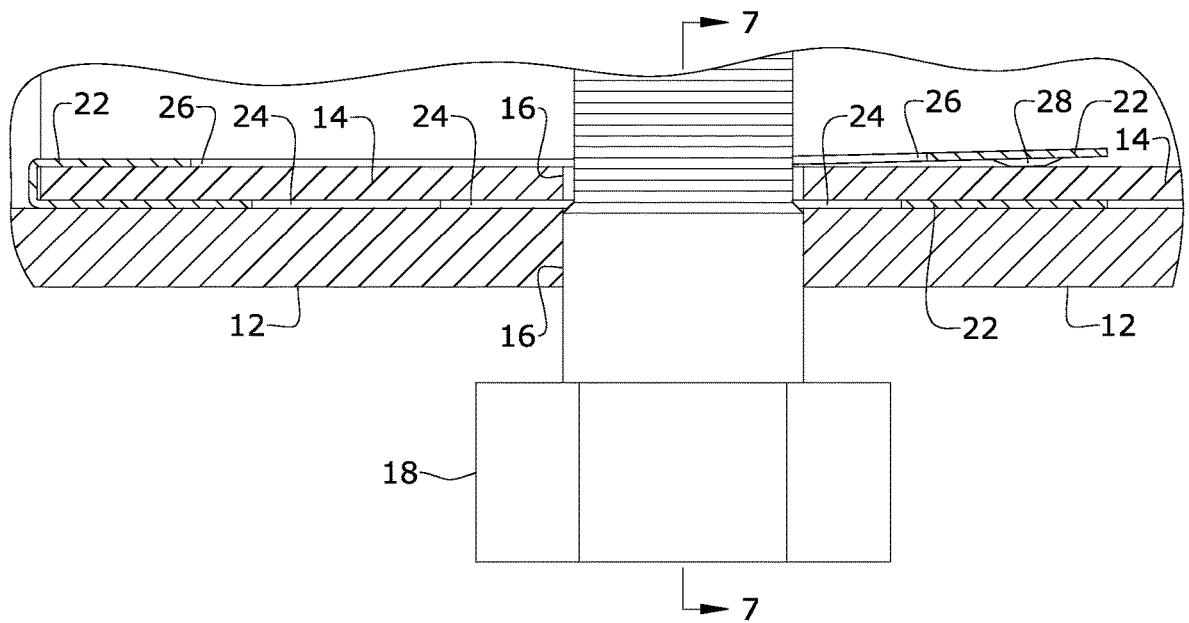
FIG. 6 is a section view taken along line 6-6 of FIG. 1.
Figure 7:
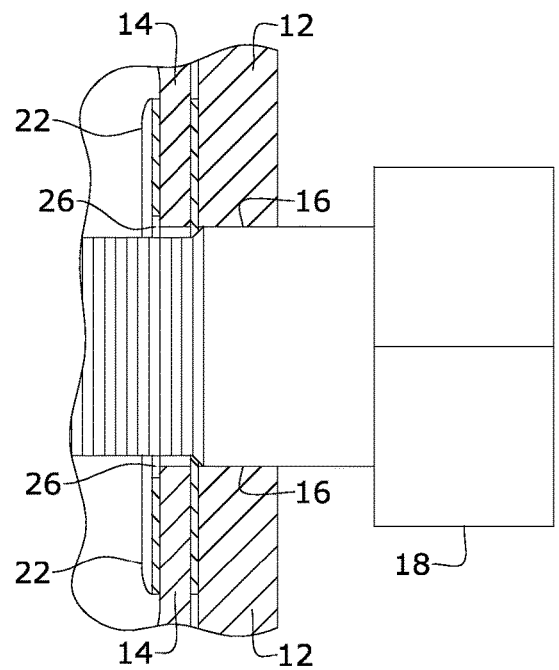
FIG. 7 is a section view taken along line 7-7 of FIG. 6.

As shown in FIGS. 6 and 7, the diameter of the insert fastener openings 24 is smaller than that of the fastener openings 16 disposed on both the receiver cover 14 and the hitch receiver 12. By way of example, the diameter of the insert fastener openings 24 may be 15 millimeters (mm) while the other fastener openings 16 may be 18 mm. In use, the insert 22 is slipped over a lateral edge/side of the hitch receiver 14, with one of the insert fastener openings 24 being aligned with the fastener opening 16 in the receiver cover 14. As a result, the diameter of that fastener opening 16 in the receiver cover 14 is, in essence, reduced due to the smaller size insert fastener openings 24 in the insert 22. As shown in FIG. 6, the dimples 28 create a pressure fit between the insert 14 and the receiver cover 24.

When the bolt 18 is inserted thought the fastener opening 16 in the hitch receiver 12, the threaded portion of the bolt 18 can pass through one of the insert fastener openings 24, with the shank portion of the bolt 18 abutting a peripheral edge of the insert fastener opening 24. When the nut 20 is threaded on the bolt 18 on an opposite side of the receiver cover 14, the previously described abutment of the shank portion and the peripheral edge creates a snug fit between the bolt 18 and the insert 22 (as opposed to the bolt 18 simply passing through the fastener opening 16 in the receiver cover 14), preventing the receiver cover 14 from movement. Further, the thickness of the walls of the insert 22 also add a slight amount of overall thickness to the assembly formed by the insert 22 and the receiver cover 14, further creating a snugger fit between the receiver cover 14 and the hitch receiver 14.

Various methods of making the insert 22 may be used. For example, the insert 22 may be formed from a sheet of stainless steel with the openings punched to shape, and the sheet bent to form a substantially U-shaped main body.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein.

While apparatuses and methods are described in terms of "comprising," "containing," or "including" various components or steps, the apparatuses and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The terms "proximal" and "distal" are defined herein relative to the vehicle body. The term "proximal" refers to the position of an element closer to the vehicle body and the term "distal" refers to the position of an element further away from the vehicle body. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A hitch insert comprising:
   a substantially U-shaped main body configured to slidably couple to a lateral side of a hitch receiver cover, the main body comprising:
   a first wall defining a plurality of hitch insert openings that partially overlap with one another, with each hitch insert opening having a diameter;
   a second wall connected to the first wall at a first joint; and
   a third wall connected to the second wall at a second joint.

2. The hitch insert of claim 1, wherein the third wall defines a substantially rectangular shaped opening.

3. The hitch insert of claim 1, wherein the third wall comprises at least one dimple on a distal end thereof and projecting towards the first wall.

4. The hitch insert of claim 1, wherein the diameter of each hitch insert opening of the plurality of hitch insert openings is the same.

5. A hitch assembly comprising:
   a hitch receiver cover comprising a lateral side defining at least one receiver cover opening having a first diameter; and
   a hitch insert comprising a substantially U-shaped main body slidably coupled to a lateral side of a hitch receiver cover, the main body comprising:
   a first wall defining a plurality of hitch insert openings that partially overlap with one another, with each hitch insert opening having a second diameter;

a second wall connected to the first wall at a first joint; and a third wall connected to the second wall at a second joint.

6. The hitch assembly of claim 5, wherein at least one hitch insert opening of the plurality of hitch insert openings aligns with the at one receiver cover opening.

7. The hitch assembly of claim 6, wherein the second diameter is smaller than the first diameter.

8. A hitch system comprising:

a hitch receiver coupled to a vehicle;

a hitch receiver cover coupled to the hitch receiver and comprising a lateral side defining at least one receiver cover opening having a first diameter;

a hitch insert comprising a substantially U-shaped main body slidably coupled to a lateral side of a hitch receiver cover, the main body comprising:

a first wall defining a plurality of hitch insert openings that partially overlap with one another, with each hitch insert opening having a second diameter;

a second wall connected to the first wall at a first joint; and a third wall connected to the second wall at a second joint; and a fastener extending through the at least one receiver cover opening and one of the plurality of hitch insert openings.

9. The hitch system of claim 8, wherein the second diameter is smaller than the first diameter.

10. The hitch system of claim 9, wherein the fastener includes a shank portion that abuts a peripheral edge of the one of the plurality of hitch insert openings.

\* \* \* \* \*